(12) United States Patent
Family et al.

(10) Patent No.: US 9,994,331 B2
(45) Date of Patent: Jun. 12, 2018

(54) AIRCRAFT FUEL TANK INERTING ARRANGEMENT, METHOD OF INERTING ONE OR MORE AIRCRAFT FUEL TANKS, AIRCRAFT AND SOFTWARE PRODUCT

(71) Applicant: AIRBUS OPERATIONS LIMITED, Bristol (GB)

(72) Inventors: Oliver Family, Bristol (GB); Mark Smiles, Bristol (GB); Dylan James, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 146 days.

(21) Appl. No.: 14/969,183

(22) Filed: Dec. 15, 2015

(65) Prior Publication Data

US 2016/0176535 A1    Jun. 23, 2016

(30) Foreign Application Priority Data

Dec. 22, 2014  (GB) .................................. 1422946.2

(51) Int. Cl.
*B64D 37/32*    (2006.01)
*A62C 3/08*    (2006.01)
*A62C 99/00*    (2010.01)
*B64D 43/00*    (2006.01)

(52) U.S. Cl.
CPC ................ *B64D 37/32* (2013.01); *A62C 3/08* (2013.01); *A62C 99/0018* (2013.01); *B64D 43/00* (2013.01)

(58) Field of Classification Search
None
See application file for complete search history.

(56) References Cited

U.S. PATENT DOCUMENTS

| 2006/0021652 A1 | 2/2006 | Surawski |
| 2006/0056482 A1 | 3/2006 | Rouquette et al. |
| 2014/0331857 A1 | 11/2014 | Massey et al. |
| 2015/0151846 A1 | 6/2015 | Haskins et al. |

FOREIGN PATENT DOCUMENTS

| GB | 2169572 A | 7/1986 |
| GB | 2520728 A | 6/2015 |
| WO | 2013079466 A2 | 6/2013 |

OTHER PUBLICATIONS

Partial European Search Report/Written Opinion dated Mar. 31, 2016 EP Application No. 15201641.

*Primary Examiner* — Jonathan M Dager
*Assistant Examiner* — Garrett F Evans
(74) *Attorney, Agent, or Firm* — Hauptman Ham, LLP (57) ABSTRACT

A method is provided of inerting one or more fuel tanks of an aircraft. The method comprises: providing a temperature value indicative of a temperature at the aircraft's destination; comparing said temperature value with a predetermined value; and on the basis of said comparison, controlling the provision of inerting gas to the one or more aircraft fuel tanks. An aircraft fuel tank inerting arrangement, a software product and an aircraft are also provided.

20 Claims, 5 Drawing Sheets

AIRCRAFT FUEL TANK INERTING ARRANGEMENT, METHOD OF INERTING ONE OR MORE AIRCRAFT FUEL TANKS, AIRCRAFT AND SOFTWARE PRODUCT

RELATED APPLICATIONS

The present application claims priority from Great Britain Application Number 1422946.2, filed Dec. 22, 2014, the disclosure of which is hereby incorporated by reference herein in its entirety.

BACKGROUND OF THE INVENTION

The present invention concerns the inerting of aircraft fuel tanks. More particularly, but not exclusively, this invention concerns a method of inerting one or more aircraft fuel tanks. The invention also concerns an aircraft fuel tank inerting arrangement, an aircraft and a software product relating to the same.

It is well-known to those skilled in the art to provide inert gas (typically oxygen-depleted air) to aircraft fuel tanks in order to reduce the likelihood of explosions occurring in the fuel tanks. It is common to provide inert gas to the aircraft fuel tanks during the ascent and descent stages of the flight and not to provide inert air during the cruise stage of a flight. However, such an approach may be rather wasteful of inerting gas and is rather arbitrary in the way in which inerting gas is supplied to the fuel tanks.

US2006/0021652 describes that inerting gas may be supplied to a fuel tank in a more controlled manner, based on measurements of temperature and pressure outside the fuel tank and sensor measurements inside the fuel tank. Unpublished GB patent application no. 1321067.9 describes the supply of inerting gas based on flight parameters, such as ascent rate, descent rate, altitude and attitude, and on sensor outputs, such as the output of gas sensors located in the fuel tank. Such arrangements are based on instant measurements and readings and do not take into account projected aircraft conditions.

The present invention seeks to mitigate one or more of the above-mentioned problems. Alternatively or additionally, the present invention seeks to provide an improved method of inerting one or more fuel tanks of an aircraft.

SUMMARY OF THE INVENTION

In accordance with a first aspect of the present invention, there is provided a method of inerting one or more fuel tanks of an aircraft, the method comprising:
providing a temperature value indicative of a temperature at the aircraft's destination;
comparing said temperature value with a predetermined value; and
on the basis of said comparison, controlling the provision of inerting gas to the one or more aircraft fuel tanks.

The method of the first aspect of the present invention facilitates at least one climatic condition at the aircraft's destination to be taken into account when deciding whether or not to inert fuel tanks.

The temperature value indicative of the temperature at the aircraft's destination may be a static air temperature. The method may comprise requesting said temperature value from a source of information and receiving said temperature value from the source of information. The source of information may be located local to the destination. The source of information may be located on the aircraft. The source of information may comprise a database comprising data providing relationships between temperature, a plurality of aircraft destinations, and optionally one or both of date and time of day. The step of requesting from a source of information a temperature value indicative of the temperature at the aircraft's destination may comprise transmitting a signal to a source of information remote from the aircraft, the signal requesting said temperature. The step of receiving from the source of information said temperature value indicative of the temperature at the aircraft's destination may comprise receiving a signal from a source of information remote from the aircraft.

The temperature value indicative of the temperature at the aircraft's destination may be a predicted value, for example, a mean, median or maximum temperature for the aircraft's destination at the predicted time of landing of the aircraft. The predicted value may be based on a measured value of temperature. For example, the predicted value may be a predicted temperature for the predicted time of landing of the aircraft, based on a measured temperature and the time at which the measurement is made. The temperature value may be a measured value. This may be the case, for example, if the aircraft is only a short time from its destination.

The method may comprise providing a temporally-spaced series of temperature values indicative of the temperature at the aircraft's destination. The provision of inerting gas may be controlled on the basis of each temperature value. For example, if said temperature has been observed to increase, the supply of inerting gas may be increased.

The predetermined value to be compared with the indicative temperature may be related to a property of the aircraft fuel, such as a flammability limit of the aircraft's fuel, for example, a lower flammability limit. The comparison may comprise calculating a difference between the predetermined value and the indicative temperature. For example, if the indicative temperature is lower than the predetermined value (for example, a fuel lower flammability limit) by at least a certain margin (such as 20° C.), then this may be indicative of there being no need for inerting gas. If the indicative temperature is not lower than the predetermined value by said margin, this may be indicative of there being a need for inerting gas. Those skilled in the art will realise that more complex mathematical relationships may be used. For example, one or both of a factor or power may be applied to the indicative temperature and/or the predetermined value.

Control of the provision of inerting gas may optionally be further dependent on one or more additional flight-related parameters. For example, if the temperature at a destination is low (indicative of there being no need for inerting gas), but the current fuel temperature is high (indicative of there being a need for inerting gas), then it may be beneficial to supply inerting gas to the fuel tanks. Control of the provision of inerting gas may be further dependent on one or more of the following parameters: aircraft altitude, aircraft attitude, time until next descent, time since last (i.e. immediately preceding) ascent, projected duration of next descent, amount of fuel in fuel tanks, gas pressure in fuel tanks, duration of previous (i.e. immediately preceding) descent, oxygen content of gas (optionally in a fuel tank), nitrogen content of gas optionally in a fuel tank), temperature indicative of fuel temperature, fuel temperature, external temperature and temperature of gas in fuel tank. The temperature indicative of fuel temperature could, for example, comprise the temperature of the fuel, the temperature of gas above the fuel in the fuel tank or external temperature.

For example, the method may comprise controlling the provision of inerting gas further dependent on a temperature indicative of fuel temperature. If the temperature indicative of fuel temperature is above a certain level (typically compared to a fuel flammability limit, typically at the operating altitude of the aircraft), then inerting gas may be provided.

Combinations of such further flight-related parameters may be used to control provision of inciting gas. For example, the time from the last ascent and the time to the next descent may be used to control provision of inerting gas. In this case, if the time from the last ascent is greater than a predetermined value (such as 30 minutes, for example) and the time to the next descent is greater than a certain value (such as 60 minutes, for example), then this is indicative of there being no need for inerting gas to be supplied to the fuel tanks. This may be described as a "cruise length law". Such further flight-related parameters are, of course, used in conjunction with the temperature value indicative of a temperature at the aircraft's destination. For example, if the "cruise length law" indicates that no inerting is required, then in the event that the destination temperature is indicative of the need for inerting, then, depending on circumstances, inerting gas may be provided to the fuel tanks or inciting gas may not be provided to the fuel tanks.

A further combination of such further flight-related parameters may comprise the duration of the immediately-preceding descent and the time until the next descent. In this case, if the duration of the previous descent was greater than a predetermined value such as 40 minutes) and the time to the next descent is greater than a certain value (such as 60 minutes, for example), then this is indicative of there being no need for inciting gas to be supplied to the fuel tanks. This may be described as a "long descent law". The output of the "long descent law" is used in combination with the temperature value indicative of a temperature at the aircraft's destination, optionally in combination with other flight-related parameters, such as the output of the "cruise length law" above, to determine whether inerting of the fuel tanks is required.

The method may comprise providing one or more valves operable to control the supply of inerting gas to the fuel tanks. One or more of the valves may operable to precisely control the supply of inerting gas to the fuel tanks. For example, one or more of the valves may comprise a butterfly valve, a globe valve, a multiple orifice valve or a ball valve.

The method may comprise providing one or more pumps operable to supply inerting gas to the fuel tanks.

The method may comprise providing an oxygen-containing gas and removing oxygen from that gas to provide oxygen-depleted gas for inerting the one or more fuel tanks. Those skilled in the art will realise that not all of the oxygen will be removed from a flow of oxygen-containing gas. The oxygen content may, for example, be reduced from about 21 vol % to about 4-12 vol %. The method may comprise providing an inlet for oxygen-containing gas. The inlet for oxygen-containing gas may be attached to a source of oxygen-containing gas. The source of oxygen-containing gas may, for example, comprise an engine bleed line. The method may comprise an outlet for delivering inerting gas (typically oxygen-depleted gas) to one or more fuel tanks.

The method may comprise providing a gas separation unit configured to remove oxygen from a flow of oxygen-containing gas to produce a flow of oxygen-depleted gas for inerting the fuel tanks.

The method may comprise removing ozone from the oxygen-containing gas. This is typically performed before removing oxygen from the oxygen-containing gas.

The method may comprise providing an ozone remover configured to remove ozone from a flow of gas. The ozone remover is typically located upstream of the gas separation unit.

The method may comprise cooling the oxygen-containing gas, optionally prior to removing oxygen from the oxygen-containing gas.

The method may comprise providing a cooler configured to cool gas. The method may comprise providing a bypass for bypassing the cooler. The cooler is typically located upstream of the gas separation unit and may be located upstream or downstream of the ozone remover, if present. The cooler may comprise a heat exchanger.

The method may comprise filtering the oxygen-containing gas to remove particulate therefrom. The method may comprise providing a particulate filter, optionally upstream of the gas separation unit and further optionally upstream of one or more of the ozone remover and cooler (if present).

The method may comprise providing one or more sensors for sensing one or more of aircraft altitude, aircraft attitude, amount of fuel in fuel tanks, gas pressure in fuel tanks, oxygen content of gas (optionally in the fuel tanks), nitrogen content of gas (optionally in the fuel tanks), temperature indicative of fuel temperature, fuel temperature, external temperature and temperature of gas in fuel tank. The outputs of said one or more sensors could be used to control provision of inerting gas to the fuel tanks.

In accordance with a second aspect of the present invention, there is provided a method of inerting one or more fuel tanks of an aircraft, the method comprising:
requesting from a source of information a temperature value indicative of a temperature at the aircraft's destination;
receiving from the source of information said temperature value indicative of a temperature at the aircraft's destination;
comparing said temperature value with a predetermined value related to a property of the aircraft's fuel; and
in response to the comparison between said temperature value and the predetermined value, controlling one or more valves and/or pumps arranged to control the supply of inerting gas to the one or more fuel tanks.

For example, if one or more valves are provided, one or more of the valves may comprise a butterfly valve, a globe valve, a multiple orifice valve or a ball valve.

The step of requesting from a source of information a temperature value indicative of the temperature at the aircraft's destination may comprise transmitting a signal to a source of information remote from the aircraft, the signal requesting said temperature. The step of receiving from the source of information said temperature value indicative of the temperature at the aircraft's destination may comprise receiving a signal from a source of information remote from the aircraft.

The step of requesting said temperature value from said source of information may comprise transmitting instructions to interrogate a database comprising data providing relationships between temperature, a plurality of aircraft destinations, and optionally one or both of date and time of day. The step of receiving said temperature value from said source of information may comprise receiving said temperature value from said database.

The step of requesting said temperature value from said source of information and receiving said temperature value from the source of information may be instigated by a temperature input module.

The step of comparing said temperature value with a predetermined value related to a property of the aircraft's fuel may be performed by a temperature input module or a control module. The temperature input module may transmit said temperature value to a control module which compares said temperature value with the predetermined value.

The method may comprise transmitting control signals (optionally from a control module) to one or more valves and/or one or more pumps to control the supply of inerting gas to the one or more fuel tanks, dependent on the comparison between said temperature value and the predetermined value.

One or both of the temperature input module and the control module may be provided by a computer processing unit.

According to a third aspect of the present invention there is also provided a software product comprising a series of instructions arranged, when executed on a computer, to perform one or more of the steps of the method of the first or second aspect of the present invention, for example, to perform that or those steps that comprise comparing the temperature value indicative of a temperature at the aircraft's destination with the predetermined value.

The software product is optionally arranged, when executed on a computer, to control the provision of inerting gas to the one or more aircraft fuel tanks, optionally on the basis of one or more other flight-related parameters.

The software product is optionally arranged, when executed on a computer, to request said indicative temperature value from a source of information and receive said temperature value from the source of information.

In particular, the software product is optionally arranged, when executed on a computer to perform one or more steps of the method of the second aspect of the present invention.

In this connection, the software product may be arranged to request, and/or receive, from a source of information of a temperature value indicative of a temperature at the aircraft's destination. In particular, the software product may be arranged to transmit, and/or receive, a signal to a source of information remote from the aircraft, the signal requesting said temperature.

The software product may be arranged to compare said temperature value with a predetermined value related to a property of the aircraft's fuel (such as a flammability level of the fuel), and optionally in response to said comparison between said temperature value and the predetermined value, control one or more valves and/or pumps arranged to control the supply of inerting gas to the one or more fuel tanks.

According to a fourth aspect of the present invention there is also provided an aircraft fuel tank inerting arrangement comprising;
a gas inlet;
a gas separation unit in gaseous communication with the gas inlet and configured to remove oxygen from a flow of oxygen-containing gas to produce a flow of oxygen-depleted gas;
at least one gas outlet configured to receive oxygen-depleted gas from the gas separation unit and to deliver oxygen-depleted gas to at least one aircraft fuel tank;
a gas flow control module for controlling the flow of oxygen-depleted gas to at least one aircraft fuel tank; and
a temperature input module for acquiring a temperature indicative of the temperature at the aircraft's destination;
the gas flow control module being configured to receive an output from the temperature input module dependent on the temperature at the aircraft's destination and to control the flow of oxygen-depleted gas to the one or more fuel tanks in dependence on the output from the temperature input module.

The temperature input module may be configured to request a temperature value from a source of information and to receive a temperature value from the source of information. The temperature input module may transmit said temperature value to the gas flow control module which may perform a comparison between said temperature value and a predetermined value or the temperature input module may perform a comparison between said temperature value and a predetermined value. The aircraft fuel tank inerting arrangement may comprise one or more of the features described above in relation to the method of the first or second aspects of the present invention.

In accordance with a fifth aspect of the present invention, there is provided an aircraft comprising an aircraft fuel tank inerting arrangement in accordance with the fourth aspect of the present invention arranged to provide inerting gas to one or more aircraft fuel tanks.

It will of course be appreciated that features described in relation to one aspect of the present invention may be incorporated into other aspects of the present invention. For example, the method of the first aspect of the present invention may incorporate any of the features described with reference to the aircraft fuel tank inerting arrangement of the fourth aspect of the invention and vice versa. Likewise, the method of the first aspect of the present invention may comprise features of the method of the second aspect of the present invention, and vice versa.

DESCRIPTION OF THE DRAWINGS

Embodiments of the present invention will now be described by way of example only with reference to the accompanying schematic drawings of which.

DETAILED DESCRIPTION

Figure 1:
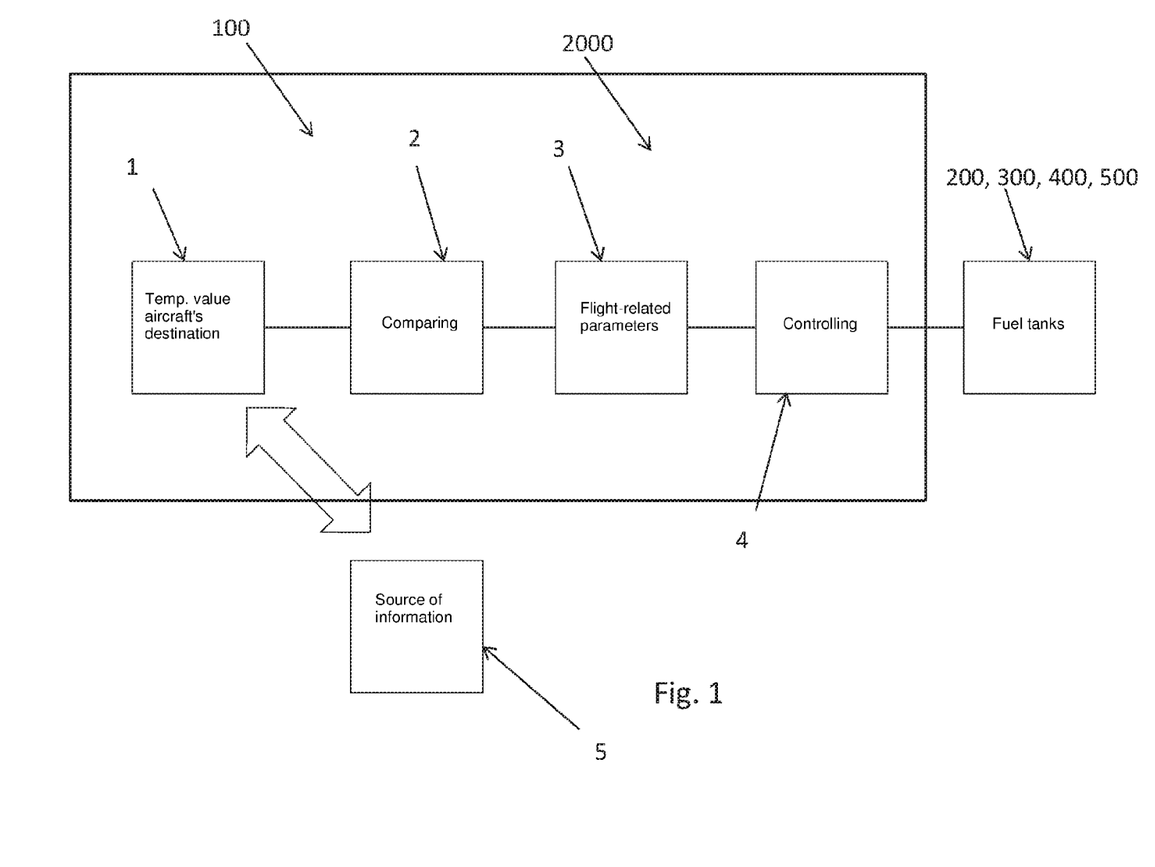
FIG. 1 shows a schematic representation of a method according to a first embodiment of the invention.

FIG. 1 illustrates an example of an embodiment of a method in accordance with the present invention. The method is denoted generally by reference numeral 100 and comprises providing 1 a temperature value indicative of a temperature at the aircraft's destination, comparing 2 that temperature value with a predetermined value, and controlling 4 the provision of inerting gas to the fuel tanks 200, 300, 400, 500. In this case, the provision of inerting gas to the fuel tanks 200, 300, 400, 500 is dependent on further flight-related parameters 3. The step of providing 1 the temperature value indicative of a temperature at the aircraft's destination comprises requesting said temperature value from a source of information 5 and receiving said temperature value from the source of information 5.

Figure 3:
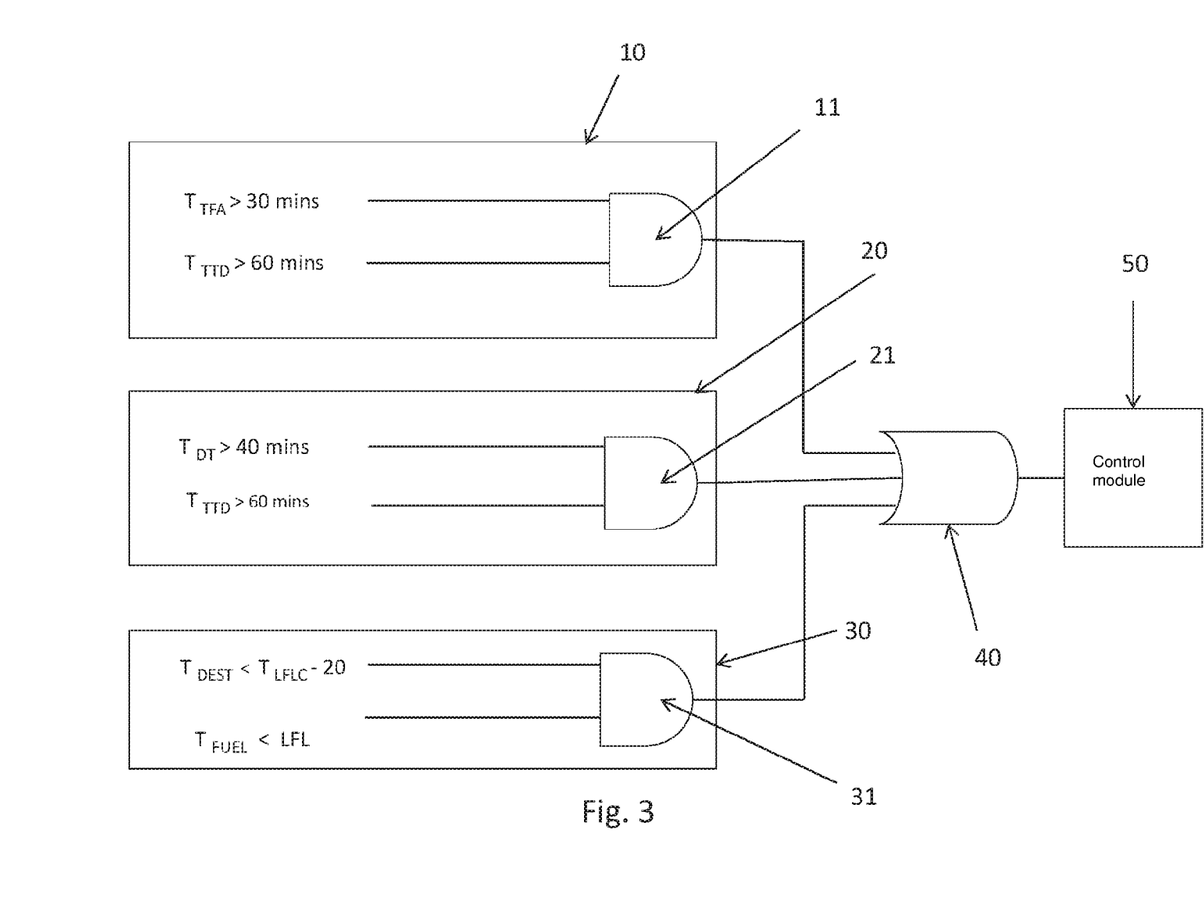
FIG. 3 shows a schematic representation of the method of FIG. 1.
Figure 4:
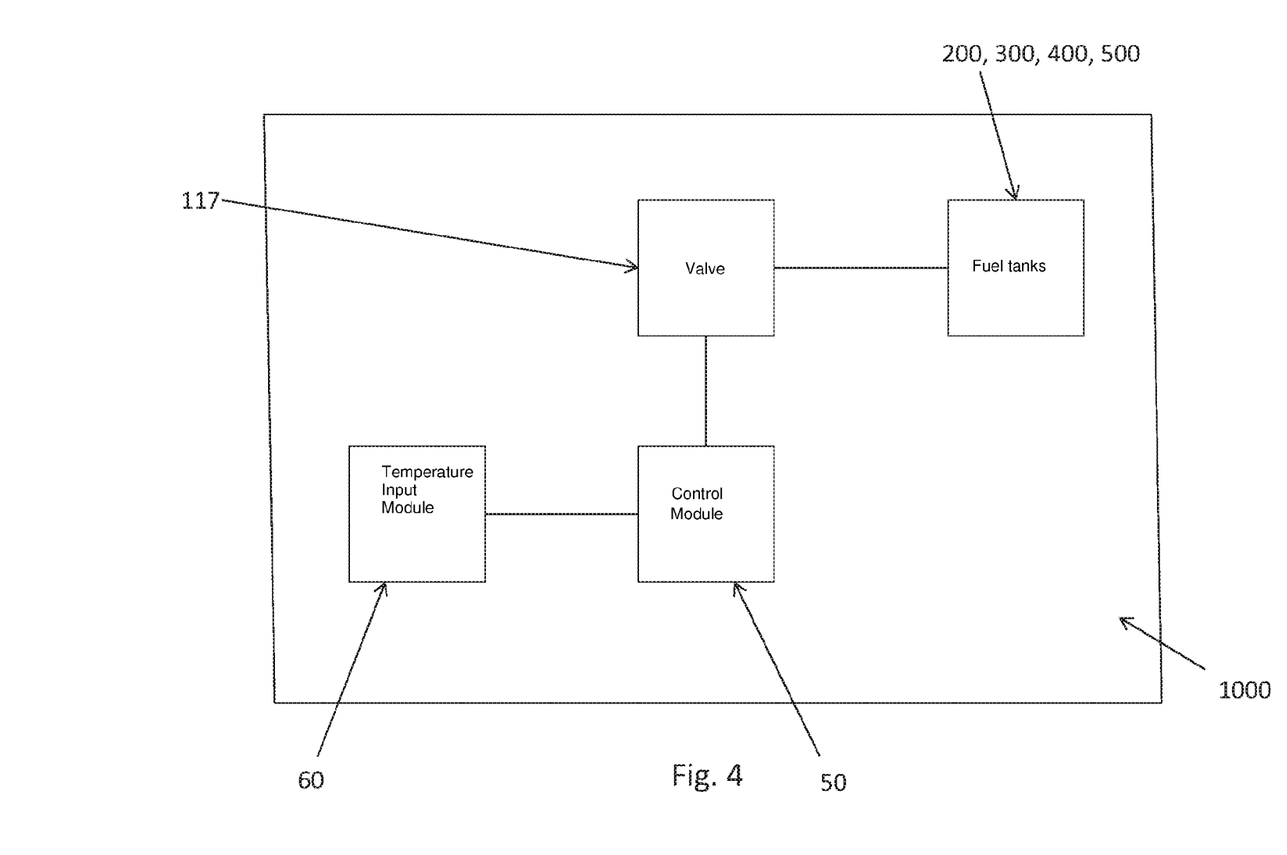
FIG. 4 shows a schematic representation of an aircraft fuel tank inerting arrangement according to a further embodiment of the invention.

The method of the present invention will now be described in more detail with reference to FIGS. 3 and 4. FIG. 3 shows a logic arrangement which may be used to control the provision of inerting gas to the fuel tanks 200, 300, 400, 500 using the temperature value indicative of a temperature at the aircraft's destination and other flight-related parameters. The logic arrangement comprises three logic decision boxes 10, 20, 30, each of which comprises two inputs to a respective AND operator 11, 21, 31. The outputs of the respective AND operators 11, 21, 31 act as inputs for an OR, operator 40, the output of which determines the control of the provision of inerting gas by the control module 50 which controls a valve 117 (see FIG. 2) which determines the provision of inerting gas to the fuel tanks. Each of the inputs to the AND operators 11, 21, 31 relates to a flight-related parameter, one of the inputs relating to the temperature indicative of the temperature at the aircraft's destination.

Figure 2:
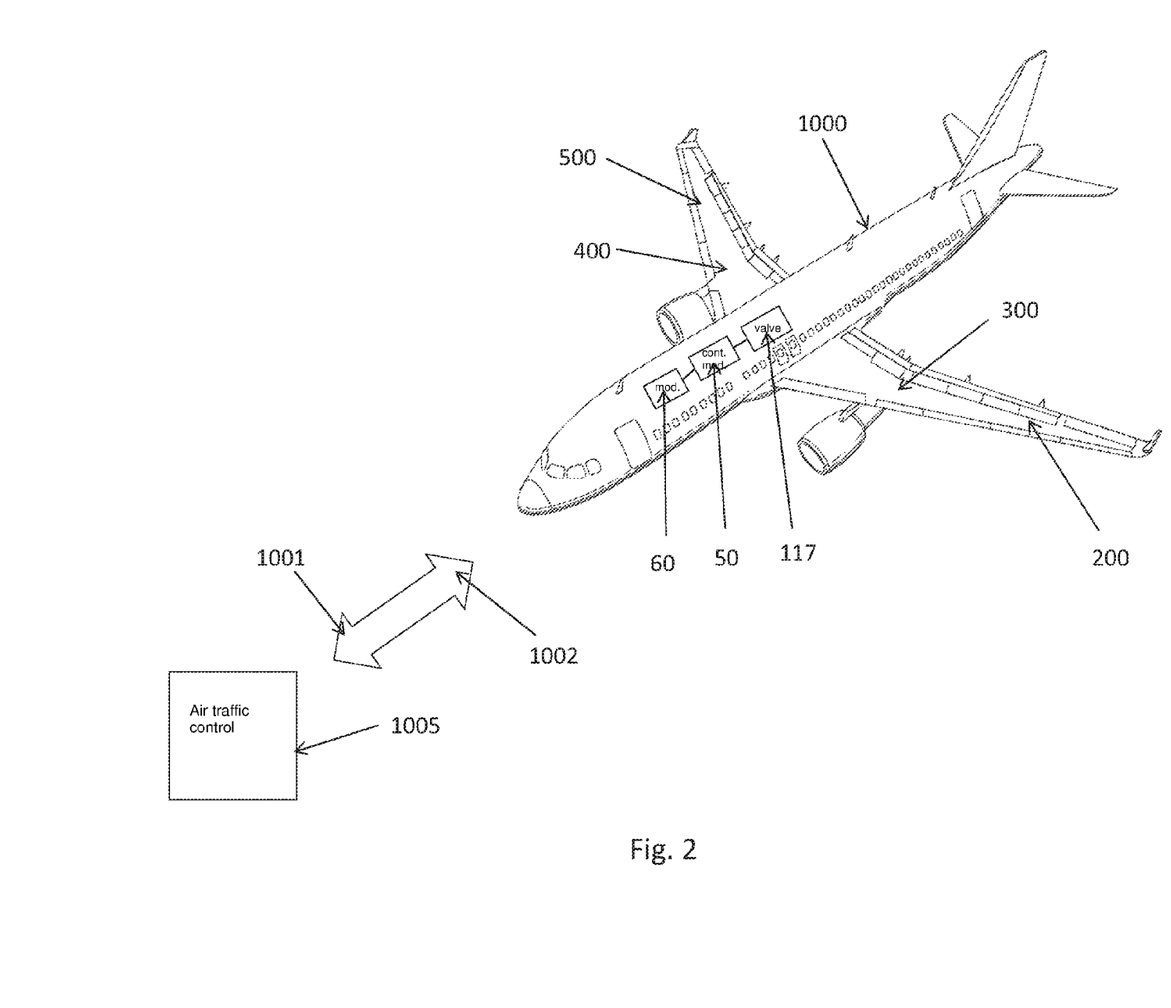
FIG. 2 shows a further schematic representation of the method of FIG. 1.

Referring now to FIG. 2, the aircraft 1000 transmits a signal 1001 (in this case, a radio signal) to a source of information 5, in this case, air traffic control 1005 located at the aircraft's destination, requesting the temperature at the aircraft's destination. The source of information 5, 1005 then replies to the request, transmitting to the temperature input module 60 of the aircraft 1000 a signal 1002 containing information relating to the temperature at the aircraft's destination. The source of operation may, alternatively, be the airline's operational centre which is in contact with the meteorological service, for example.

The temperature input module 60 may transmit the temperature value ($T_{DEST}$) to a control module 50 for comparison with a predetermined value or may compare the temperature value to the predetermined value itself. Dependent on the comparison between the temperature value and the predetermined value, the control module 50 then controls the valve 117 to control the provision of inerting gas to the fuel tanks 200, 300, 400, 500, as will be discussed below.

The predetermined value in this case is the conservative lower flammability limit ($T_{LFLC}$ in logic box 30 of FIG. 3) at the altitude of the destination (in ° C.) minus 20. The lower flammability limit at the altitude of the destination may be calculated from the lower flammability limit at sea level. If the temperature value is lower than the predetermined value ($T_{LFLC}-20$), then a non-zero (binary 1) destination temperature output results. This output is combined logically with an output from a further logical operation, that being a comparison of the fuel temperature ($I_{FUEL}$) with the lower flammability limit at the aircraft's current altitude (LFL), as shown in logic box 30. In the event that the fuel temperature is less than the lower flammability limit at the current altitude, a non-zero (binary 1) fuel temperature output results. The fuel temperature and destination temperature outputs are fed into AND operator 31, the output of AND operator 31 forming an input for OR operator 40. Therefore, the output of the AND operator 31 will only be non-zero (binary 1) if the temperature of the fuel is sufficiently low and the temperature at the aircraft's destination is sufficiently low.

The control of the provision of inerting gas is not merely dependent on the fuel temperature and the destination temperature, as can readily be seen from FIG. 3. The control of the provision of inerting gas is also dependent on the time since the end of the immediately preceding ascent ($T_{TFA}$), the time to the next descent ($T_{TTD}$) and the duration of the immediately preceding descent ($T_{DT}$), as will now be explained. Referring to logic box 10 in FIG. 3, if the time since the end of the immediately preceding ascent ($T_{TFA}$) is greater than a predetermined value (in this case, 30 minutes) and the time to the next descent ($T_{TTD}$) is greater than a predetermined value (in this case, 60 minutes), then the output of the AND operator 1 and an input to OR operator 40) will be non-zero (binary 1).

Referring to logic box 20 in FIG. 3, if the duration of the immediately-preceding descent ($T_{DT}$) is greater than a predetermined value (in this case, 40 minutes) and the time to the next descent ($T_{TTD}$) is greater than a predetermined value (in this case, 60 minutes), then the output of the AND operator 21 (and an input to OR operator 40) will be non-zero (binary 1).

As indicated above, the outputs of the AND operators 11, 21, 31 form the three inputs to OR operator 40. If one or more of the outputs of the AND operators 11, 21, 31 is non-zero, then the output of the OR operator 40 will be non-zero (binary 1). If this is the case, then the non-zero output of the OR operator is indicative that inerting gas should not be provided to the fuel tanks. If none of the outputs of the AND operators 11, 21, 31 was non-zero, then the output of the OR operator would be zero, being indicative that the inerting gas should be provided to the fuel tanks 200, 300, 400, 500.

Figure 5:
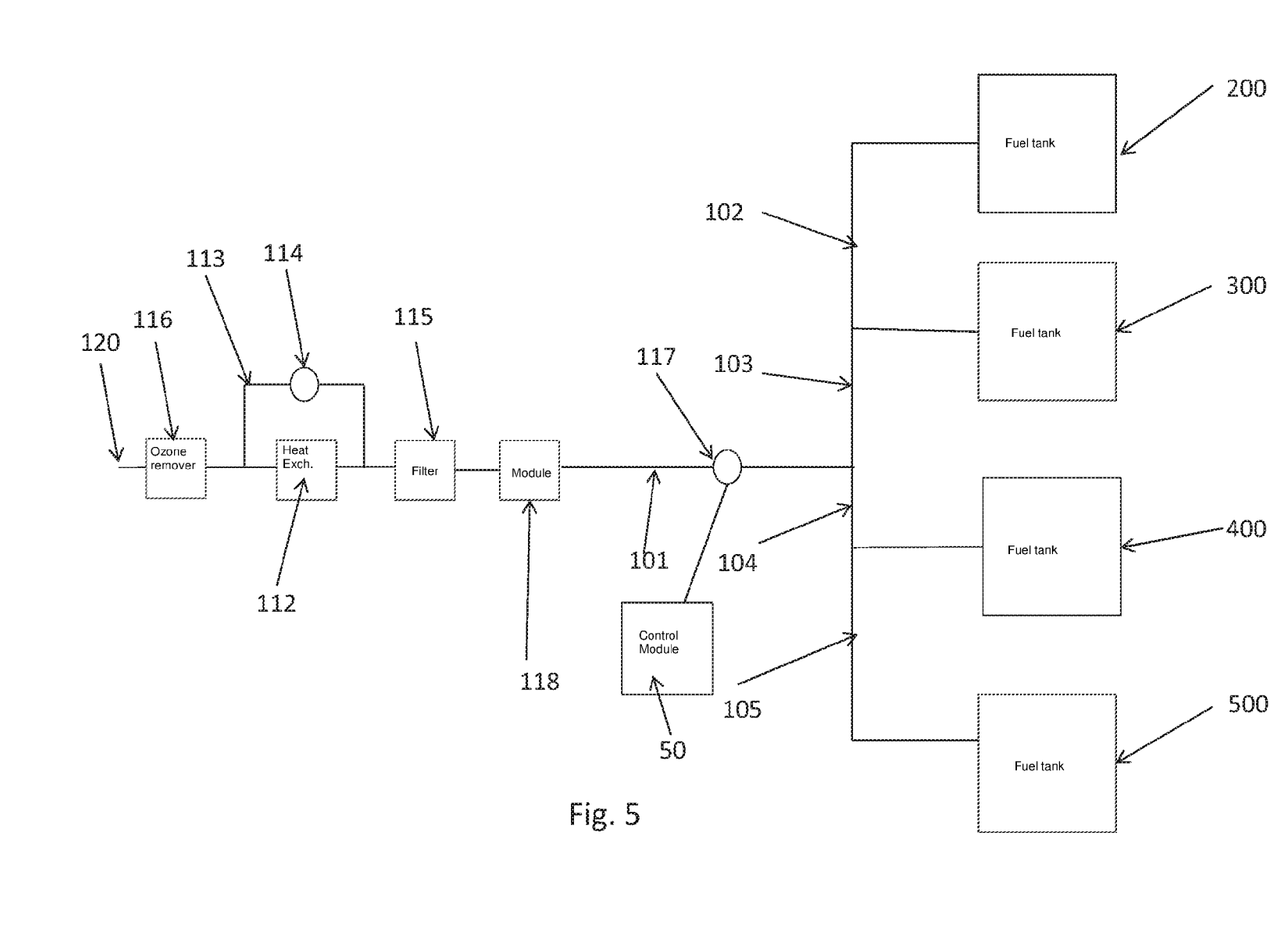
FIG. 5 shows a schematic representation of some of the components used in the aircraft fuel tank inerting arrangement of FIG. 4.

FIG. 5 shows the various components of a system for supplying inerting gas to fuel tanks. An inerting system inlet 120 (in this case, air is obtained from an engine bleed) is connected to a gas separation module 118 which takes gas from the engine bleed and removes oxygen therefrom, providing oxygen-depleted air for supply to fuel tanks 200, 300, 400, 500 via conduits 101-105. The inerting system further comprises an ozone remover 116 configured to remove ozone from the gas feed. Ozone has an adverse effect on the gas separation module 118. Having passed through the ozone remover 116, gas then passes through a heat exchanger 112 which is used to cool the gas from about 350° C. to about 50-100° C. A bypass 113 is provided so that some gas does not pass through the heat exchanger 112, thereby providing better control of the temperature of the gas. The bypass is provided with a valve 114 to permit operation of the bypass 113. The gas is then passed through a particulate filter 115 which removes particulate which may adversely affect the operation of the gas separation module 118. Gas then passes into the gas separation module 118, typically with an oxygen content of about 21% by volume. After passing through the gas separation module 118 the gas has an oxygen content of about 4-12% by volume. The aircraft compartment inerting system further comprises a valve 117 operable to control the flow of oxygen-depleted air into fuel tanks 200, 300, 400, 500. The pressure of the inerting gas is typically 20-55 PSTG. The operation of the valve 117 is determined by the control module 50 is operated in conjunction with the logic described above in relation to FIGS. 1, 2, 3 and 4.

The various steps of the method described above are controlled by a computer software product 2000 which is loaded onto an aircraft computer. The computer software product controls the transmission of the signal 1001 requesting said temperature value and the receipt of the signal 1002 which contains the temperature value. The software product enables the comparison of the temperature value indicative of the temperature at the aircraft's destination and the predetermined value, thereby determining whether it is necessary to provide inerting gas to the fuel tanks 200, 300, 400, 500, and provides the instructions consistent with the logic described above ibn relation to FIG. 3. The software product further contains the instructions for operating the valve 117 in dependence on the comparison between the destination temperature value and the predetermined value.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The example of FIG. 3 is merely one logic arrangement which could be used. For example, alternative flight-related parameters may be used, and different logical combinations of such flight parameters may be used. For example, for a super-safe system, the OR, operator 40 may be replaced by an AND operator, meaning that each of the inputs to the AND operator would have to be positive in order to indicate no provision of inerting gas. Alternatively, the logic may be amended to require only two of the outputs of the AND operators 11, 21, 31 have to be positive in order to indicate no provision of inerting gas.

The example above defines the predetermined value with which the destination temperature ($T_{DEST}$) is compared as being $T_{LFLC}$-20. Other temperatures could be used. For example, the predetermined value may be $T_{LFLC}$, $T_{LFLC}$-2 or $T_{LFLC}$-5, for example.

The example above demonstrates how a temperature value indicative of the temperature at the aircraft's destination may be used in conjunction with other flight parameters to control the provision of inerting gas to an aircraft's fuel tanks. In certain circumstances, the temperature value indicative of the temperature at the aircraft's destination could be used on its own without reference to other parameters to control the provision of inerting gas to an aircraft's fuel tanks.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A computer-implemented method of inerting one or more fuel tanks of an aircraft, the method comprising:
   providing a temperature value indicative of a temperature at the aircraft's landing destination prior to a time of landing;
   comparing said temperature value with a predetermined value; and
   on the basis of said comparison, controlling the provision of inerting gas to the one or more aircraft fuel tanks.

2. The computer-implemented method according to claim 1 in which the temperature value indicative of the temperature at the aircraft's landing destination is a static air temperature.

3. The computer-implemented method according to claim 1 comprising requesting said temperature value from a source of information and receiving said temperature from said source of information.

4. A computer-implemented method of inerting one or more fuel tanks of an aircraft, the method comprising:
   providing a temperature value indicative of a temperature at the aircraft's destination prior to a time of landing, said temperature value being provided by requesting said temperature value from a source of information and receiving said temperature from said source of information, the source of information comprising a database comprising data providing relationships between temperature and a plurality of aircraft landing destinations;
   comparing said temperature value with a predetermined value;
   on the basis of said comparison, controlling the provision of inerting gas to the one or more aircraft fuel tanks.

5. The computer-implemented method according to claim 1 in which the temperature value indicative of the temperature at the aircraft's landing destination is a predicted value.

6. The computer-implemented method according to claim 1 in which the temperature value is a measured value.

7. The computer-implemented method according to claim 1 in which the predetermined value to be compared with the indicative temperature is related to a property of the aircraft fuel.

8. The computer-implemented method according to claim 7 in which the predetermined value is related to a flammability limit of the aircraft's fuel.

9. The computer-implemented method according to claim 1 in which the comparison comprises calculating a difference between the predetermined value and the indicative temperature, wherein if the indicative temperature value is lower than the predetermined value by at least a certain margin, then this is indicative of there being no need for inerting gas.

10. The computer-implemented method according to claim 1 in which control of the provision of inerting gas is further dependent on one or more additional flight-related parameters.

11. The computer-implemented method according to claim 10 in which control of the provision of inerting gas is further dependent on one or more of the following parameters: aircraft altitude, aircraft attitude, time until next descent, time since last ascent, projected duration of next descent, amount of fuel in fuel tanks, gas pressure in fuel tanks, duration of previous descent, oxygen content of gas, nitrogen content of gas, temperature indicative of fuel temperature, fuel temperature, external temperature and temperature of gas in fuel tank.

12. The computer-implemented method according to claim 1 comprising controlling the provision of inerting gas further dependent on one or more of: a temperature indicative of fuel temperature; the time from the last ascent and the time to the next descent and the duration of the immediately-preceding descent and the time until the next descent.

13. A computer-implemented method of inerting one or more fuel tanks of an aircraft, the method comprising:
   requesting from a source of information a temperature value indicative of a temperature at the aircraft's landing destination prior to a time of landing;
   receiving from the source of information said temperature value indicative of a temperature at the aircraft's landing destination;
   comparing said temperature value with a predetermined value related to a property of the aircraft's fuel; and
   in response to the comparison between said temperature value and the predetermined value, controlling one or more valves and/or pumps arranged to control the supply of inerting gas to the one or more fuel tanks.

14. A computer-implemented method of inerting one or more fuel tanks of an aircraft, the method comprising:
   requesting from a source of information a temperature value indicative of a temperature at the aircraft's landing destination prior to a time of landing;

receiving from the source of information said temperature value indicative of a temperature at the aircraft's landing destination;

comparing said temperature value with a predetermined value related to a property of the aircraft's fuel;

in response to the comparison between said temperature value and the predetermined value, controlling one or more valves and/or pumps arranged to control the supply of inerting gas to the one or more fuel tanks;

the step of requesting from a source of information a temperature value indicative of the temperature at the aircraft's landing destination comprising transmitting a signal to a source of information remote from the aircraft, the signal requesting said temperature, and the step of receiving from the source of information said temperature value indicative of the temperature at the aircraft's landing destination comprises receiving a signal from a source of information remote from the aircraft.

15. A computer-implemented method of inerting one or more fuel tanks of an aircraft, the method comprising:

requesting from a source of information a temperature value indicative of a temperature at the aircraft's landing destination prior to a time of landing;

receiving from the source of information said temperature value indicative of a temperature at the aircraft's landing destination;

comparing said temperature value with a predetermined value related to a property of the aircraft's fuel;

in response to the comparison between said temperature value and the predetermined value, controlling one or more valves and/or pumps arranged to control the supply of inerting gas to the one or more fuel tanks;

the step of requesting said temperature value from said source of information comprising transmitting instructions to interrogate a database comprising data providing relationships between temperature and a plurality of aircraft landing destinations, and and the step of receiving said temperature value from said source of information comprises receiving said temperature value from said database.

16. A non-transitory software product comprising a series of instructions arranged, when executed on a computer, to perform one or more of the steps of the method of claim 1.

17. An aircraft fuel tank inerting arrangement comprising;

a gas inlet;

a gas separation unit in gaseous communication with the gas inlet and configured to remove oxygen from a flow of oxygen-containing gas to produce a flow of oxygen-depleted gas;

at least one gas outlet configured to receive oxygen-depleted gas from the gas separation unit and to deliver oxygen-depleted gas to at least one aircraft fuel tank;

a gas flow control module for controlling the flow of oxygen-depleted gas to the at least one aircraft fuel tank; and a temperature input module for acquiring a temperature indicative of the temperature at the aircraft's landing destination prior to a time of landing;

the gas flow control module being configured to receive an output from the temperature input module dependent on the temperature at the aircraft's landing destination and to control the flow of oxygen-depleted gas to the one or more fuel tanks in dependence on the output from the temperature input module.

18. The aircraft fuel tank inerting arrangement according to claim 17, the temperature input being configured to request a temperature value from a source of information and to receive a temperature value from the source of information.

19. An aircraft comprising the aircraft fuel tank inerting arrangement according to claim 17 arranged to provide inerting gas to one or more fuel tanks of the aircraft.

20. The computer-implemented method according to claim 15, the database comprising data providing relationships between temperature, a plurality of aircraft landing destinations, and one or both of date and time of day.

* * * * *